(12) United States Patent
Fu

(10) Patent No.: US 12,534,578 B2
(45) Date of Patent: Jan. 27, 2026

(54) LIQUID SILICATE RESINS

(71) Applicant: DOW SILICONES CORPORATION, Midland, MI (US)

(72) Inventor: Peng-Fei Fu, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 793 days.

(21) Appl. No.: 17/789,179

(22) PCT Filed: Dec. 23, 2020

(86) PCT No.: PCT/US2020/066819
§ 371 (c)(1),
(2) Date: Jun. 25, 2022

(87) PCT Pub. No.: WO2021/138188
PCT Pub. Date: Jul. 8, 2021

(65) Prior Publication Data
US 2023/0110842 A1    Apr. 13, 2023

Related U.S. Application Data

(60) Provisional application No. 62/955,098, filed on Dec. 30, 2019.

(51) Int. Cl.
  *C08G 77/18* (2006.01)
  *C08G 77/08* (2006.01)
  *C08G 77/20* (2006.01)

(52) U.S. Cl.
  CPC .............. *C08G 77/20* (2013.01); *C08G 77/08* (2013.01); *C08G 77/18* (2013.01)

(58) Field of Classification Search
  CPC .................................................... C08G 77/18
  USPC ........................................ 528/15, 31, 32, 39
  See application file for complete search history.

(56) References Cited

U.S. PATENT DOCUMENTS

| | | | |
|---|---|---|---|
| 5,510,430 A | 4/1996 | Rubinsztajn et al. | |
| 5,674,966 A | 10/1997 | McDermott et al. | |
| 5,932,668 A * | 8/1999 | Friebe .................. | C08G 77/20 |
| | | | 524/588 |
| 8,791,213 B2 * | 7/2014 | Mizunashi ............ | G02B 1/041 |
| | | | 528/31 |
| 11,608,415 B2 * | 3/2023 | Watanabe ............. | H01G 9/045 |
| 2002/0061998 A1 | 5/2002 | Cray et al. | |
| 2003/0153711 A1 | 8/2003 | Mutoh et al. | |
| 2016/0289388 A1 | 10/2016 | Fu et al. | |

FOREIGN PATENT DOCUMENTS

| | | |
|---|---|---|
| CN | 1281881 A | 1/2001 |
| EP | 0812870 A1 | 12/1997 |
| EP | 1070734 A2 | 1/2001 |
| GB | 2301830 A | 12/1996 |
| JP | H1093196 A | 1/1997 |
| JP | H09136961 A | 5/1997 |
| JP | H09202828 A | 8/1997 |
| JP | 2003213000 A | 7/2003 |
| JP | 2017500420 A | 1/2017 |
| WO | 2005063890 A2 | 7/2005 |
| WO | 2018112911 A1 | 6/2018 |

OTHER PUBLICATIONS

International Search Report for PCT/US2020/066819 dated Apr. 12, 2021, 4 pages.

* cited by examiner

*Primary Examiner* — Margaret G Moore
(74) *Attorney, Agent, or Firm* — Warner Norcross + Judd LLP

(57) ABSTRACT

A silicate resin that is a liquid at 25° C. in the absence of any solvent is disclosed. The silicate resin has the average formula: $[W]_a[X]_b[Y]_c[Z]_d$, where subscript a is from greater than 0 to 0.5; subscript b is from greater than 0 to 0.5; subscript c is from 0 to 0.5; and subscript d is from greater than 0 to 0.6; with the proviso that a+b+c+d=1; and wherein W, X, Y and Z are defined siloxy units. A method of preparing the silicate resin is also disclosed.

11 Claims, No Drawings

LIQUID SILICATE RESINS

CROSS-REFERENCE TO RELATED APPLICATIONS

This application is the U.S. National Stage of International Application No. PCT/US2020/066819 filed on 23 Dec. 2020, which claims priority to and all advantages of U.S. Provisional Patent Application No. 62/955,098 filed on 30 Dec. 2019, the content of which is incorporated herein by reference.

This application claims priority to and all advantages of U.S. Provisional Patent Application No. 62/955,098 filed on 30 Dec. 2019, the content of which is incorporated herein by reference.

TECHNICAL FIELD

The subject disclosure generally relates to a resin and, more specifically, to silicate resin that is a liquid at 25° C. in the absence of any solvent and to method of its preparation.

BACKGROUND

Silicone resins are known in the art and utilized in various end use applications. Silicone resins typically include three-dimensional networks attributable to the presence of T siloxy units ($R^OSiO_{3/2}$) and/or Q siloxy units ($SiO_{4/2}$), where $R^O$ is a substituent. Properties of silicone resins differ depending on, among other things, their cross-link densities and molar fractions of siloxy units. Increasing the cross-link density generally results in a silicone resin having greater hardness and/or rigidity.

Conventional silicone resins are solids at room temperature, or 25° C. As such, conventional silicone resins are typically utilized in or as solutions, wherein the conventional silicone resin is dissolved in a solvent for processing purposes. The solvent can be driven or volatilized prior to or during end use applications. However, removal of solvent necessary for solubilizing solid silicone resins adds processing steps and cost in connection with end use applications utilizing such solid silicone resins.

BRIEF SUMMARY

A silicate resin that is a liquid at 25° C. in the absence of any solvent is disclosed. The silicate resin has the average formula:

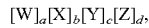

$[W]_a[X]_b[Y]_c[Z]_d$, where subscript a is from greater than 0 to 0.5; subscript b is from greater than 0 to 0.5; subscript c is from 0 to 0.5; and subscript d is from greater than 0 to 0.6; with the proviso that a+b+c+d=1; and wherein:

[W] is $[R_3SiO_{1/2}]$, where each R is an independently selected hydrocarbyl group;

[X] is $[R_2SiO_{1/2}(OZ)]_{b'}$ $[R_2SiO_{2/2}]_{b''}$, where each R is independently selected and defined above; $0 \leq b' \leq 1$; $0 \leq b'' \leq 1$; with the proviso that b'+b''=0 or 1; and wherein each Z is independently H, an alkyl group, or a cation;

[Y] is $[RSi(OZ)_{c'}O_{3-c''/2}]$, where each R is independently selected, each Z is independently selected, c' is an integer from 0 to 2 and is independently selected in each siloxy unit indicated by subscript c in the silicate resin; and

[Z] is $[Si(OZ)_{d'}O_{4-d''/2}]$, where each Z is independently selected and defined above, and subscript d' is an integer from 0 to 3 and is independently selected in each siloxy unit indicated by subscript d in the silicate resin.

When subscript c is zero, siloxy units indicated by subscript b include at least $[R^1_2SiO_{2/2}]$ and $[R^1R^2SiO_{2/2}]$ siloxy units, where $R^1$ is a hydrocarbyl group free of ethylenic unsaturation, and $R^2$ is an ethylenically unsaturated group. In addition, an average of at least one R per molecule is an ethylenically unsaturated group.

A method of preparing the silicate resin that is a liquid at 25° C. in the absence of any solvent is also disclosed.

DETAILED DESCRIPTION

Disclosed is a silicate resin that is a liquid at 25° C. in the absence of any solvent. The silicate resin may alternatively be referred to as a silicone resin, but is a silicate resin in view of the presence of Q siloxy, or $SiO_{4/2}$, units in the silicate resin. Generally, silicone resins and in particular silicate resins are solids at 25° C. due to their three-dimensional networked structure. In view of the difficulty of processing solid silicone resins, silicone resins are typically dissolved in solvent and utilized as a silicone resin composition, which comprises or consists of a solid silicone resin dissolved in a solvent, e.g. an aliphatic or aromatic hydrocarbon solvent. In this way, the silicone resin compositions are liquid at 25° C. or room temperature, which allows easier processing of the silicone resin compositions. For example, silicone resin compositions can be combined with other components or compositions for various end use applications in liquid form. Similarly, conventional silicone resins, which are solid at 25° C. in the absence of any solvent, are not readily miscible with liquid silicones. This means that when preparing silicone compositions, conventional silicone resins, which are solid at 25° C., cannot be readily mixed or solubilized with liquid silicones, e.g. liquid organopolysiloxanes, in the absent of organic solvent. Thus, when conventional silicone resins are utilized in silicone compositions, organic solvents are typically required for purposes of forming the silicone compositions and subsequently volatilized, either in composition form or when curing.

However, one drawback of silicone compositions is that the solvent is typically removed in end use applications. For example, when silicone compositions are utilized to form films, coatings or articles, the solvent is typically removed when forming such films or articles. This requires additional processing steps, as well as energy and related cost, for removal of solvent, e.g. via volatilization.

In contrast, the inventive silicate resin is a liquid at 25° C. in the absence of any solvent. Thus, the silicate resin being a liquid at 25° C. is not attributable to the presence of any solvent, e.g. organic solvent, unlike conventional silicone resins. The silicate resin consists of silicate resin without any solvent or carrier vehicle. Further still, not only is the silicate resin a liquid at 25° C. in the absence of any solvent, but the silicate resin is miscible with other liquid organopolysiloxanes, which allows for the direct incorporation of the silicate resin in various silicone compositions in solvent-less form, but in terms of preparation and end composition.

By "liquid", it is meant that the silicate resin is flowable at 25° C. and/or has a viscosity that is measurable at 25° C., in the absence of any solvent. Typically, the viscosity of the silicate resin is measurable at 25° C. via a Brookfield LV DV-E viscometer with a spindle selected as appropriate to the viscosity of the silicate resin. The viscosity of the silicate resin may vary, particularly based on the content of M, D, T and/or Q siloxy units present therein, as described below. However, for purposes of this disclosure, the silicate resin can be in the form of a gum, as gums still have flowable characteristics, even if gums do not have viscosities that can be readily measured at 25° C.

In specific embodiments, the silicate resin has the average formula:

$$[W]_a[X]_b[Y]_c[Z]_d,$$

where subscript a is from greater than 0 to 0.5; subscript b is from greater than 0 to 0.5; subscript c is from 0 to 0.5; and subscript d is from greater than 0 to 0.6; with the proviso that a+b+c+d=1. Subscripts a, b, c and d are mole fractions of the W, X, Y, and Z units in the silicate resin.

In the average formula above for the silicate resin, [W], [X], [Y], and [Z] are utilized in lieu of the more common nomenclature [M], [D], [T] and [Q]. As understood in the art, M siloxy units include one siloxane bond (i.e., —O—Si—); D siloxy units include two siloxane bonds; T siloxy units include three siloxane bonds; and Q siloxy units include four siloxane bonds.

However, for purposes of this disclosure, [W] indicates siloxy units including one —Si—O— bond, which may be a siloxane bond or a precursor thereof. Precursors of siloxane bonds are —Si—OZ bonds, where Z is independently H, an alkyl group, or a cation, such as K$^+$ or Na$^+$, alternatively H or an alkyl group. Silanol groups and alkoxy groups can hydrolyze and/or condense to give siloxane bonds and are typically inherently present in most silicone resins. Such precursors of siloxane bonds can be minimized by bodying of silicone resins, which results in further condensation with water as a by-product. Thus, for purposes of this disclosure, [W] indicates [R$_3$SiO$_{1/2}$], where each R is an independently selected hydrocarbyl group.

Further, for purposes of this disclosure, [X] indicates siloxy units including two —Si—O— bonds, which may independently be siloxane bonds or a precursor thereof. Thus, for purposes of this disclosure, [X] is [R$_2$SiO$_{1/2}$(OZ)]$_{b'}$[R$_2$SiO$_{2/2}$]$_{b''}$, where each R is independently selected and defined above; 0≤b'≤b; 0≤b''≤b; with the proviso that b'+b''=b; and wherein each Z is independently H, an alkyl group, or a cation. Subscripts b' and b'' indicate the relative mole fraction of [X] siloxy units indicated by subscript b' and those indicated by subscript b'', respectively, with regard to the overall average formula of the silicate resin. In [X] siloxy units indicated by b', there is one siloxane bond and one Si—OZ bond, and in the [X] siloxy units indicated by subscript b'', there are two siloxane bonds.

Further, for purposes of this disclosure, [Y] indicates siloxy units including three —Si—O— bonds, which may independently be siloxane bonds or a precursor thereof. Thus, for purposes of this disclosure, [Y] is [RSi(OZ)$_{c'}$O$_{3-c''/2}$], where each R is independently selected and defined above; c' is an integer from 0 to 2 and is independently selected in each Y siloxy unit indicated by subscript c in the silicate resin. Thus, [Y] can indicate any combination of the following siloxy units: [RSiO$_{3/2}$], [RSi(OZ)$_1$O$_{2/2}$], and/or [RSi(OZ)$_2$O$_{1/2}$].

Further, for purposes of this disclosure, [Z] indicates siloxy units including four —Si—O— bonds, which may independently be siloxane bonds or a precursor thereof. Thus, for purposes of this disclosure, [Z] is [Si(OZ)$_{d'}$O$_{4-d''/2}$], where each Z is independently selected and defined above, and subscript d' is an integer from 0 to 3 and is independently selected in each siloxy unit indicated by subscript c in the silicate resin. The silicate resin can include siloxy units indicated by subscript d where d' is 0, d' is 1, d' is 2, and d' is 3. The siloxy units represented by [Z] can have one, two, three, or four siloxane bonds, with the balance being Si—OZ moieties. Thus, [Z] can indicate any combination of the following siloxy units: [SiO$_{4/2}$], [Si(OZ)O$_{3/2}$], [Si(OZ)$_2$O$_{2/2}$], and/or [Si(OZ)$_3$O$_{1/2}$].

In certain embodiments, subscript a is from greater than zero to 0.5. In specific embodiments, subscript a is from 0.10 to 0.50, alternatively from 0.15 to 0.40, alternatively from 0.2 to 0.4, alternatively from 0.2 to 0.35, alternatively from 0.25 to 0.30, alternatively from 0.25 to 0.35, alternatively from 0.28 to 0.32.

In these or other embodiments, subscript b is from greater than zero to 0.5. In specific embodiments, subscript b is from 0.10 to 0.40, alternatively from 0.15 to 0.40, alternatively from 0.10 to 0.30, alternatively from 0.15 to 0.30, alternatively from 0.15 to 0.2, alternatively from 0.2 to 0.3. Subscripts b' and b'' define the relative amounts of particular siloxy units represented by [X]. As noted above, 0≤b'≤b; 0≤b''≤b; with the proviso that b'+b''=b. Subscript b' can be 0 while subscript b'' is b, or subscript b' can be b while subscript b'' is 0, or both subscripts b' and b'' can be 0. When both siloxy units indicated by b' and b'' are present in the silicate resin, 0<b'<b; 0<b''<b; with the proviso that b'+b''=b. In certain embodiments when both b' and b'' are >0, b''>b'.

In these or other embodiments, subscript c is 0. However, in alternative embodiments, subscript c is greater than 0, for example from greater than zero to 0.5, alternatively from greater than 0 to 0.4, alternatively from greater than 0 to 0.3, alternatively from greater than 0 to 0.2, alternatively from greater than 0 to 0.10, alternatively from greater than 0 to 0.08, alternatively from 0.01 to 0.10. When subscript c is zero, siloxy units indicated by subscript b include at least [R$^1_2$SiO$_{2/2}$] and [R$^1$R$^2$SiO$_{2/2}$] siloxy units, where R$^1$ is a hydrocarbyl group free of ethylenic unsaturation, and R$^2$ is an ethylenically unsaturated group.

In these or other embodiments, subscript d is from greater than zero to 0.6. In specific embodiments, subscript d is from 0.35 to 0.60, alternatively from 0.40 to 0.60, alternatively from 0.40 to 0.55, alternatively from 0.45 to 0.55, alternatively from 0.45 to 0.52.

R is an independently selected hydrocarbyl group. In certain embodiments, at least one, alternatively at least two, of R are independently ethylenically unsaturated groups in each molecule of the silicate resin. In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In specific embodiments, each R is independently selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms, and from ethylenically unsaturated (i.e., alkenyl and/or alkynyl groups) groups having from 2 to 32, alternatively from 2 to 28, alternatively from 2 to 24, alternatively from 2 to 20, alternatively from 2 to 16, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2=CH-$, $CH_2=CHCH_2-$, $CH_2=CH(CH_2)_4-$, $CH_2=CH(CH_2)_6-$, $CH_2=C(CH_3)CH_2-$, $H_2C=C(CH_3)-$, $-H_2C=C(CH_3)-$, $-H_2C=C(CH_3)CH_2-$, $-H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Typically, when R is an ethylenically unsaturated group, the ethylenic unsaturation is terminal in R. As understood in the art, ethylenic unsaturation may be referred to as aliphatic unsaturation.

In specific embodiments, only siloxy units indicated by subscript b include R groups having ethylenic unsaturation. In these embodiments, the R groups of siloxy units indicated by subscripts a and c are free of ethylenic unsaturation, and a specific example thereof is methyl. In certain embodiments, the silicate resin includes, as siloxy units indicated by subscript b, both dimethylsiloxy units and methylvinyl siloxy units. In other embodiments, the silicate resin includes, as siloxy units indicated by subscript b, methylvinyl siloxy units but not dimethyl siloxy units. It yet other embodiments, siloxy units indicated by subscript c are present and include ethylenically unsaturated functionality, either in addition to or in lieu of that which may be present in siloxy units indicated by subscript b. The relative amount of such siloxy units can be selectively controlled when preparing the silicate resin. As understood in the art, the siloxy units set forth above are exemplary only, and methyl may be replaced with other hydrocarbyl groups, and vinyl may be replaced with other ethylenically unsaturated groups.

In certain embodiments, the silicate resin has a content of SiOZ moieties of from 12 to 80, alternatively from 15 to 70, alternatively from 15 to 60, alternatively from 15 to 50, alternatively from 15 to 40, alternatively from 15 to 30, percent based on the total number of moles of Si in each molecule. The content of SiOZ moieties can be calculated via $^{29}$Si-NMR. In particular, the molar content of the following siloxy units in the silicate resin are determined:

$W=R_3SiO_{1/2}$
$X1=R_2(OZ)SiO_{1/2}$
$X2=R_2SiO_{2/2}$
$Y1=R(OZ)_2SiO_{1/2}$
$Y2=R(OZ)SiO_{2/2}$
$Y3=RSiO_{3/2}$
$Z1=(OZ)_3SiO_{1/2}$
$Z2=(OZ)_2SiO_{1/2}$
$Z3=(OZ)SiO_{3/2}$
$Z4=SiO_{4/2}$

OZ content relative to silicon atoms as a mol % can be calculated with the following formula with the label for each peak in the formula corresponding to the integrated area under the peak corresponding to the label:

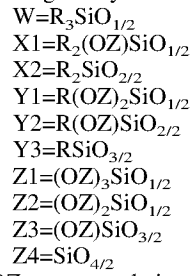

$$OZ \text{ content (mol \%)} = 100\% \times \left( \frac{(X1 + 2 \times Y1 + Y2 + 3 \times Z1 + 2 \times Z2 + Z3)}{(W + X1 + X2 + Y1 + Y2 + Y3 + Z1 + Z2 + Z3 + Z4)} \right)$$

In these or other embodiments, the silicate resin has a weight percent of silicon-bonded ethylenically unsaturated groups of from greater than 0 to 10, alternatively from based on the total weight of the silicate resin. The weight percent of silicon-bonded ethylenically unsaturated groups is independent from the viscosity of the silicate resin, which is unlike the weight percent of silicon-bonded ethylenically unsaturated groups of conventional solid silicone resins, which is a function of the viscosity thereof once dispersed in a liquid organopolysiloxane polymer or vehicle. Thus, the weight percent of silicon-bonded ethylenically unsaturated groups can be increased without impacting viscosity of the silicate resin, for example. The weight percent of silicon-bonded ethylenically unsaturated groups can be selective controlled when preparing the silicate resin, as described below.

In these or other embodiments, the weight percent of silicon-bonded ethylenically unsaturated groups in the silicate resin can be selectively controlled independent from viscosity of the silicate resin. In contrast, in conventional silicone resins including silicon-boned ethylenically unsaturated groups, the content thereof is a function of viscosity, which limits the ability to selectively control content of silicon-bonded ethylenically unsaturated groups at certain viscosities, inherently limiting certain end use applications. In various embodiments, the silicate resin has a weight-average molecular weight of from 1,000 to 100,000, alternatively from 1,000 to 50,000, alternatively from 1,000 to 10,000. Molecular weight may be measured via gel permeation chromatography (GPC) relative to polystyrene standards. In these or other embodiments, the silicate resin has a viscosity at 25° C. of from 10 to 500,000, alternatively from 10 to 250,000, alternatively from 10 to 100,000, cP. Viscosity may be measured at 25° C. via a Brookfield LV DV-E viscometer with a spindle selected as appropriate to the viscosity of the silicate resin, as understood in the art. The viscosity and the molecular weight of the silicate resin can be controlled when preparing the silicate resin. In other embodiments, the silicate resin is a gum at 25° C., in which case the silicate resin may not have a viscosity that can be readily measured at 25° C., but which still has flowable characteristics and is considered a liquid for purposes of this disclosure.

In specific embodiments, subscript c is 0. As introduced above, when subscript c is zero, siloxy units indicated by subscript b include at least $[R^1_2SiO_{2/2}]$ and $[R^1R^2SiO_{2/2}]$ siloxy units, where $R^1$ is a hydrocarbyl group free of ethylenic unsaturation, and $R^2$ is an ethylenically unsaturated group. Exemplary examples of such silicate resins include those of general formulas $[W]_{0.289}[X]_{0.170}[X^{Vi}]_{0.031}[Z]_{0.511}$, $[W]_{0.256}[X]_{0.209}[X^{Vi}]_{0.030}[Z]_{0.504}$, $[W]_{0.265}[X]_{0.237}[X^{Vi}]_{0.007}[Z]_{0.492}$, $[W]_{0.323}[X]_{0.134}[X^{Vi}]_{0.031}[Z]_{0.513}$, and $[W]_{0.313}[X]_{0.153}[X^{Vi}]_{0.018}[Z]_{0.516}$, where W is $[(Me)_3SiO_{1/2}]$, X is $[Me_2SiO_{1/2}(OZ)]$ and/or $[Me_2SiO_{2/2}]$, $X^{Vi}$ is $[MeViSiO_{1/2}(OZ)]$ and/or $[MeViSiO_{2/2}]$, and Z is $[SiO_{1/2}(OZ)_3]$, $[SiO_{2/2}(OZ)_2]$, $[SiO_{3/2}(OZ)]$, and/or $[SiO_{4/2}]$.

In other embodiments, subscript c is >0. Exemplary examples of such silicate resins include those of general formulas $[W]_{0.300}[X]_{0.180}[Y^{Vi}]_{0.020}[Z]_{0.500}$, $[W]_{0.300}[X^{Vi}]_{0.180}[Y^{Vi}]_{0.050}[Z]_{0.480}$, and $[W]_{0.300}[X^{Vi}]_{0.180}[Y]_{0.020}[Z]_{0.480}$, where W, X, $X^{Vi}$ and Z are defined above, and Y is $[MeSiO_{3/2}]$, $[MeSi(OZ)_1O_{2/2}]$, and/or $[MeSi(OZ)_2O_{1/2}]$, and $Y^{Vi}$ is $[ViSiO_{3/2}]$, $[ViSi(OZ)_1O_{2/2}]$, and/or $[ViSi(OZ)_2O_{1/2}]$.

A method of preparing the silicate resin is also disclosed. In various embodiments, the silicate resin is prepared from an MQ resin, where M designates $(R^0_3SiO_{1/2})$ siloxy units, and Q designates $(SiO_{4/2})$ siloxy units, where $R^0$ designates a silicon-bonded substituent. Such MQ resins are known in the art and are often in solid (e.g. powder or flake) form unless disposed in a solvent. However, typically in the nomenclature utilized in the art, M siloxy units are trimethylsiloxy units, whereas the MQ resin may include hydrocarbyl groups other than methyl groups. Typically, however, the M siloxy units of the MQ resin are trimethylsiloxy units.

The MQ resin may have formula $M_zQ$, where subscript z refers to the molar ratio of M siloxy units to Q siloxy units when the number of moles of Q siloxy units is normalized to 1. The greater the value of z, the lesser the crosslink density of the MQ resin. The inverse is also true, because as the value of z decreases, the number of M siloxy units decreases, and thus more Q siloxy units are networked without termination via an M siloxy unit. The fact that the formula for the MQ resin normalizes the content of Q siloxy units to 1 does not imply that the MQ resin includes only one Q unit. Typically, the MQ resin includes a plurality of Q siloxy units clustered or bonded together. The MQ resin may include, in certain embodiments, up to 4, alternatively up to 3, alternatively up to 2, weight percent of hydroxyl groups.

In specific embodiments, subscript z is <1, e.g. subscript n is from 0.05 to 0.99, alternatively from 0.10 to 0.95, alternatively from 0.15 to 0.90, alternatively from 0.25 to 0.85, alternatively from 0.40 to 0.80. In these embodiments, on a molar basis, there are more Q siloxy units than M siloxy units in the MQ resin. However, z may be >1 in other embodiments, e.g. from >1 to 6, alternatively from >1 to 5, alternatively from >1 to 4, alternatively from >1 to 3, alternatively from >1 to 2.

In specific embodiments, to prepare the silicate resin from the MQ resin, the MQ resin is reacted with a silane component comprising a silane compound in the presence of a catalyst. The silane compound typically has the formula $R^2R^3_xSi(OR^3)_{3-x}$, where $R^2$ is defined above, each $R^3$ is an independently selected alkyl group having from 1 to 4 carbon atoms, and subscript x is 0 or 1. The silane compound includes a silicon-bonded ethylenically unsaturated group and two or three silicon-bonded alkoxy groups. When subscript x is zero, the silane compound includes three silicon-bonded alkoxy groups. When x is one, the silane compound includes two silicon-bonded alkoxy groups. The silane compound is utilized to impart ethylenic unsaturation in the silicate resin via $R^2$. The silicon-bonded alkoxy groups can be independently selected and typically have from 1 to 10, alternatively from 1 to 8, alternatively from 1 to 6, alternatively from 1 to 4, alternatively 1 or 2, alternatively 1, carbon atom. For example, the silicon-bonded alkoxy groups can be methoxy, ethoxy, propoxy, butoxy, etc. When subscript x is 1, the silane compound is incorporated into the silicate resin as siloxy groups indicated by $X^{Vi}$, i.e., $[MeViSiO_{1/2}(OZ)]$ and/or $[MeViSiO_{2/2}]$, where methyl can be replaced with any hydrocarbyl group based on $R^3$ and vinyl can be replaced with any ethylenically unsaturated group based on $R^2$. When subscript x is 0, the silane compound is incorporated into the silicate resin as siloxy groups indicated by $Y^{Vi}$, i.e., $[ViSiO_{3/2}]$, $[ViSi(OZ)_1O_{2/2}]$, and/or $[ViSi(OZ)_2O_{1/2}]$, where vinyl can be replaced with any ethylenically unsaturated group based on $R^2$.

Combinations of different silane compounds may be utilized, For example, in certain embodiments, the silane component further comprises a second silane compound having the formula $R^3_2Si(OR^3)_2$, where $R^3$ is independently selected and defined above. In these embodiments, the second silane compound is incorporated into the silicate resin as siloxy groups indicated by X, i.e., $[Me_2SiO_{1/2}(OZ)]$ and/or $[Me_2SiO_{2/2}]$, where methyl can be replaced with any hydrocarbyl group based on $R^3$.

In yet further embodiments, the silane component further comprises a third silane compound having the formula $R^3Si(OR^3)_3$, or $R^2Si(OR^3)_3$ where $R^3$ and $R^2$ are independently selected and defined above. In these embodiments, the third silane compound is incorporated into the silicate resin as siloxy groups indicated by Y, i.e., $[MeSiO_{3/2}]$, $[MeSi(OZ)_1O_{2/2}]$, and/or $[MeSi(OZ)_2O_{1/2}]$, or $[ViSiO_{3/2}]$, $[ViSi(OZ)_1O_{2/2}]$, and/or $[ViSi(OZ)_2O_{1/2}]$ where methyl can be replaced with any hydrocarbyl group based on $R^3$ and vinyl can be replaced with any ethylenically unsaturated group based on $R^2$.

In the method of preparing the silicate resin, the base catalyst typically cleaves siloxane bonds of the MQ resin, typically between M and Q siloxy units, to give SiOZ groups, where Z is defined above. The silane compounds of the silane component can hydrolyze and condense with the SiOZ groups to be incorporated therein. Both the cleaved siloxy bonds and inclusion of linear siloxy units attributable to the silane compound results in the silicate resin being liquid at 25° C. in the absence of any solvent.

The relative amount of the silane component (and the first, second, and/or third silane compounds therein) utilized as compared to the MQ resin is a function of the desired subscript b (and optionally subscript c) in the silicate resin. One of skill in the art understands how to selectively control such content in view of the description herein, including the Examples which follow this detailed description.

The MQ resin and the silane compound are reacted in the presence of a catalyst. Typically, the catalyst is an acid or a base such that the reaction between the MQ resin and the silane component is either an acid catalyzed or a base catalyzed reaction. Typically, the reaction is base catalyzed. As such, in certain embodiments, the catalyst may be selected from the group of strong acid catalysts, strong base catalysts, and combinations thereof. The strong acid catalyst may be trifluoromethane sulfonic acid and the like. The catalyst is typically a strong base catalyst. Typically, the strong base catalyst is KOH, although other base catalysts, such as a phosphazene base catalyst, may be utilized.

The phosphazene catalyst, which generally includes at least one —(N=P<)— unit (i.e., a phosphazene unit) and is usually an oligomer having up to 10 such phosphazene units, for example having an average of from 1.5 up to 5 phosphazene units. The phosphazene catalyst may be, for example, a halophosphazene, such as a chlorophosphazene (phosphonitrile chloride), an oxygen-containing halophosphazene, an ionic derivative of a phosphazene such as a phosphazenium salt, particularly an ionic derivative of a phosphonitrile halide such as a perchlorooligophosphazenium salt, or a partially hydrolyzed form thereof.

In specific embodiments, the catalyst comprises a phosphazene base catalyst. The phosphazene base catalyst may be any known in the art but typically has the following chemical formula:

$$((R^4{}_2N)_3P{=}N)_t(R^4{}_2N)_{3-t}P{=}NR^4$$

wherein each $R^4$ is independently selected from the group of a hydrogen atom, R, and combinations thereof, and t is an integer from 1 to 3. If $R^4$ is a R, then $R^4$ is typically an alkyl group having from 1 to 20, alternatively from 1 to 10, alternatively from 1 to 4, carbon atoms. The two $R^4$ groups in the any $(R^4{}_2N)$ moiety may be bonded to the same nitrogen (N) atom and linked to complete a heterocyclic ring preferably having 5 or 6 members.

Alternatively, the phosphazene base catalyst may be a salt and have one of the following alternative chemical formulas:

$$[((R^4{}_2N)_3P{=}N)_t(R^4{}_2N)_{3-t}P{=}N(H)R^4]^+[A^-]; \text{ or}$$

$$[((R^4{}_2N)_3P{=}N)_s(R^4{}_2N)_{4-s}P]^+[A^-]$$

wherein each $R^4$ is independently selected and defined above, subscript t is defined above, subscript s is an integer from 1 to 4, and [A] is an anion and is typically selected from the group of fluoride, hydroxide, silanolate, alkoxide, carbonate and bicarbonate. In one embodiment, the phosphazene base is an aminophosphazenium hydroxide.

In certain embodiments, the MQ resin and the silane component are reacted at an elevated temperature, e.g. from 75 to 125° C., in the presence of a solvent. Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. A neutralizing agent, such as acetic acid, may be utilized to neutralize the catalyst after the reaction. One of skill in the art can readily determine a catalytic quantity of the catalyst to be utilized, which is a function of its selection and reaction conditions. The resulting silicate resin can be isolated or recovered from the reaction product via conventional techniques, e.g. stripping or other volatilization techniques.

Because the silicate resin is a liquid at 25° C. in the absence of any solvent, the silicate resin is suitable for myriad end use applications. For example, the silicate resin may be utilized in release coating compositions, pressure sensitive adhesives, paints, conformal coatings, protective films, etc. The end use applications of the silicate resin are not limited and the silicate resin may be utilized in lieu of any conventional silicone resin.

The following examples are intended to illustrate the invention and are not to be viewed in any way as limiting to the scope of the invention. Certain components utilized in the Examples are set forth in Table 1 below, followed by characterization and evaluation procedures also used in the Examples.

TABLE 1

| Components | |
|---|---|
| Component | Chemical Description |
| Silicate Resin (A1) | $W_{0.289}X_{0.170}X^{\eta}{}_{0.031}Y_{0.511}$ |
| Silicate Resin (A2) | $W_{0.256}X_{0.209}X^{\eta}{}_{0.030}Y_{0.504}$ |
| Silicate Resin (A3) | $W_{0.265}X_{0.237}X^{\eta}{}_{0.007}Y_{0.492}$ |
| Silicate Resin (A4) | $W_{0.323}X_{0.134}X^{\eta}{}_{0.031}Z_{0.513}$ |
| Silicate Resin (A5) | $W_{0.313}X^{\eta}{}_{0.153}X^{\eta}{}_{0.018}Z_{0.516}$ |
| Silicate Resin (A6) | $W_{0.300}X_{0.180}Y^{\eta}{}_{0.002}Z_{0.500}$ |
| Silicate Resin (A7) | $W_{0.300}X^{\eta}{}_{0.180}Y^{\eta}{}_{0.005}Z_{0.480}$ |
| Silicate Resin (A8) | $W_{0.300}X^{\eta}{}_{0.180}Y_{0.002}Z_{0.500}$ |
| W | $(CH_3)_3SiO_{1/2}$ |
| $X^{\eta}$ | $[MeViSiO_{1/2}(OZ)]$ and $[MeViSiO_{2/2}]$ |
| X | $[Me_2SiO_{1/2}(OZ)]$ and $[Me_2SiO_{2/2}]$ |
| Y | $[MeSiO_{3/2}]$, $[MeSiO_{2/2}(OZ)]$ and $[MeSiO_{1/2}(OZ)_2]$ |
| $Y^{\eta}$ | $[ViSiO_{3/2}]$, $[ViSiO_{2/2}(OZ)]$ and $[ViSiO_{1/2}(OZ)_2]$ |
| Z | $[SiO_{1/2}(OZ)_3]$, $[SiO_{2/2}(OZ)_2]$, $[SiO_{3/2}(OZ)]$, and $[SiO_{4/2}]$ |
| OZ | OH or OMe |
| MQ Resin | $[Me_3SiO_{1/2}]_{0.43}[SiO_{4/2}]_{0.57}$ |
| Silane Compound 1 | Vinylmethyldimethoxysilane |
| Silane Compound 2 | Dimethyldimethoxysilane |
| Silane Compound 3 | Vinyltrimethoxysilane |
| Silane Compound 4 | Methyltrimethoxysilane |
| Catalyst | KOH |
| Neutralizing Agent | Acetic Acid |
| Solvent 1 | Toluene $(C_7H_8)$ |

Nuclear Magnetic Resonance Spectroscopy (NMR)

Nuclear magnetic resonance (NMR) spectra are obtained on a Varian EX-400 5 MHz Mercury spectrometer with $CDCl_3$ solvent. Chemical shifts for $^1$H-NMR, $^{13}$C-NMR, and $^{29}$Si-NMR spectra are referenced to internal solvent resonance and are reported relative to tetramethylsilane.

Gel Permeation Chromatography (GPC)

Gel permeation chromatography (GPC) analysis is conducted on an Agilent 1260 Infinity chromatograph equipped with a triple detector composed of a differential refractometer, an online differential viscometer, a low angle light scattering (LALS: 15° and 90° angles of detection), and a column (2 PL Gel Mixed C, Varian). Toluene (HPLC grade, Biosolve) is used as mobile phase, at a flow rate of 1 mL/min.

Dynamic Viscosity (DV)

Dynamic viscosity (DV) is measured with a Brookfield DV-III Ultra Programmable Rheometer equipped with a CPA-52Z spindle, using a sample volume of 0.5 mL, at a temperature of 25° C.

SiOZ Content

The content of SiOZ moieties can be calculated via $^{29}$Si-NMR. In particular, the molar content of the following siloxy units in each silicate resin are determined:

$W=R_3SiO_{1/2}$
$X1=R_2(OZ)SiO_{1/2}$
$X2=R_2SiO_{2/2}$
$Y1=R(OZ)_2SiO_{1/2}$
$Y2=R(OZ)SiO_{2/2}$
$Y3=RSiO_{3/2}$
$Z1=(OZ)_3SiO_{1/2}$
$Z2=(OZ)_2SiO_{1/2}$
$Z3=(OZ)SiO_{3/2}$
$Z4=SiO_{4/2}$

OZ content relative to silicon atoms as a mol % can be calculated with the following formula with the label for each peak in the formula corresponding to the integrated area under the peak corresponding to the label:

$$OZ \text{ content (mol \%)} = 100\% \times \left( \frac{(X1 + 2 \times Y1 + Y2 + 3 \times Z1 + 2 \times Z2 + Z3)}{(W + X1 + X2 + Y1 + Y2 + Y3 + Z1 + Z2 + Z3 + Z4)} \right)$$

R in the Examples can be methyl or vinyl.

Example 1: Silicate Resin (A1)

300 g of Solvent 1, followed by 300 g of MQ Resin were disposed in a 2 L flask equipped with a magnetic stir-bar. 20.16 grams of Silane Compound 1, 105.3 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.36 grams of Neutralizing Agent were disposed in the flask to neutralize the Catalyst. The reaction product in the flask was filtered through a 0.45 micron filter to give a clear and viscous liquid. Silicate Resin (A1) was isolated from the reaction product through removal of volatiles via roto-vap. Silicate Resin (A1) was a colorless liquid having a DV of 75,000 cP at 25° C., a weight-average molecular weight of 5,450 and a polydispersity of 1.7149, each as measured via GPC. The (A1) Silicate Resin had an SiOZ content of 19.12 mole % and a vinyl content of 1.12 wt. %.

Example 2: Silicate Resin (A2)

300 g of Solvent 1, followed by 300 g of MQ Resin were disposed in a 2 L flask equipped with a magnetic stir-bar. 20.2 grams of Silane Compound 1, 131.1 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 0.45 micron filter to give a clear and viscous liquid. Silicate Resin (A2) was isolated from the reaction product through removal of volatiles via roto-vap. Silicate Resin (A2) was a colorless liquid having a DV of 9,500 cP at 25° C., a weight-average molecular weight of 7,380 and a polydispersity of 1.8996, each as measured via GPC. The (A2) Silicate Resin had an SiOZ content of 25.33 mole % and a vinyl content of 1.09 wt. %.

Example 3: Silicate Resin (A3)

The same method as that of Preparation Example 2 was repeated. Silicate Resin (A3) was a colorless liquid having a DV of 9,900 cP at 25° C., a weight-average molecular weight of 5,820 and a polydispersity of 1.7562, each as measured via GPC. The (A3) Silicate Resin had an SiOZ content of 25.35 mole % and a vinyl content of 0.24 wt. %.

Example 4: Silicate Resin (A4)

200 g of Solvent 1, followed by 300 g of MQ Resin were disposed in a 2 L flask equipped with a magnetic stir-bar. 20.2 grams of Silane Compound 1, 80.6 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 1 micron filter to give a clear and viscous liquid. Silicate Resin (A4) was isolated from the reaction product through removal of volatiles via roto-vap. Silicate Resin (A4) was a colorless gum having liquid characteristics at 25° C., a weight-average molecular weight of 4,329, and a polydispersity of 1.55, each as measured via GPC. The (A4) Silicate Resin had an SiOZ content of 15.5 mole % and a vinyl content of 1.13 wt. %.

Example 5: Silicate Resin (A5)

200 g of Solvent 1, followed by 300 g of MQ Resin were disposed in a 2 L flask equipped with a magnetic stir-bar. 10.4 grams of Silane Compound 1, 89.7 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 1 micron filter to give a clear and viscous liquid. Silicate Resin (A5) was isolated from the reaction product through removal of volatiles via roto-vap. Silicate Resin (A5) was a colorless gum having liquid characteristics at 25° C., a weight-average molecular weight of 5,397 and a polydispersity of 1.70, each as measured via GPC. The (A5) Silicate Resin had an SiOZ content of 14.35 mole % and a vinyl content of 0.68 wt. %.

Example 6: Silicate Resin (A6)

200 g of Solvent 1, followed by 300 g of MQ Resin were disposed in a 2 L flask equipped with a magnetic stir-bar. 12.2 grams of Silane Compound 3, 138.7 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.36 grams of Neutralizing Agent were disposed in the flask to neutralize the Catalyst. The reaction product in the flask was filtered through a 0.45 micron filter to give a clear and viscous liquid. Silicate Resin (A6) was isolated from the reaction product through removal of volatiles via roto-vap. Silicate Resin (A6) was a colorless liquid having a DV of 21,000 cP at 25° C., a weight-average molecular weight of 3,130, and a polydispersity of 1.39, each as measured via GPC. The (A6) Silicate Resin had an SiOZ content of 25.0 mole % and a vinyl content of 1.00 wt. %.

Example 7: Silicate Resin (A7)

200 g of Solvent 1, followed by 300 g of MQ Resin were disposed in a 2 L flask equipped with a magnetic stir-bar. 31.1 grams of Silane Compound 3, 109.0 grams of Silane Compound 1, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.36 grams of Neutralizing Agent were disposed in the flask to neutralize the Catalyst. The reaction product in the flask was filtered through a 0.45 micron filter to give a clear and viscous liquid. Silicate Resin (A7) was isolated from the reaction product through removal of volatiles via roto-vap. Silicate Resin (A7) was a colorless liquid having a DV of 459,600 cP at 25° C., a weight-average molecular weight of 5,148 and a polydispersity of 1.92, each as measured via GPC. The (A7) Silicate Resin had an SiOZ content of 21.44 mole % and a vinyl content of 8.66 wt. %.

Example 8: Silicate Resin (A8)

200 g of Solvent 1, followed by 300 g of MQ Resin were disposed in a 2 L flask equipped with a magnetic stir-bar. 28.1 grams of Silane Compound 4, 109.0 grams of Silane Compound 1, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.36 grams of Neutralizing Agent were disposed in the flask to neutralize the Catalyst. The reaction product in the flask was filtered through a 0.45 micron filter to give a clear and viscous liquid. Silicate Resin (A8) was isolated from the reaction product through removal of volatiles via roto-vap. Silicate Resin (A8) was a colorless liquid having a DV of 4,260 cP at 25° C., a weight-average molecular weight of 5,240 and a polydispersity of 1.92, each as measured via GPC. The (A8) Silicate Resin had an SiOZ content of 20.80 mole % and a vinyl content of 6.82 wt. %.

DEFINITIONS AND USAGE OF TERMS

Abbreviations used in the specification have the definitions in Table 2, below.

TABLE 2

| Abbreviations | |
| --- | --- |
| Abbreviation | Definition |
| cP | centiPose |
| d | day |
| Da | Daltons |
| DP | degree of polymerization |
| FTIR | Fourier Transfer Infra-Red |
| g | grams |
| GC | gas chromatography |
| GPC | gel permeation chromatography |
| HPLC | high performance liquid chromatography |
| Me | methyl |
| mg | milligrams |
| MHz | megaHertz |
| mL | milliliters |
| mm | millimeters |
| Mn | number average molecular weight as measured by GPC |
| Mp | Peak molecular weight as measured by GPC |
| mPa · s | milli-Pascal seconds |
| MS | mass spectroscopy |
| Mw | weight average molecular weight |
| Mz | Z-average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |
| RH | relative humidity |
| RT | room temperature of 25° C. |
| s | seconds |

TABLE 2-continued

| Abbreviations | |
| --- | --- |
| Abbreviation | Definition |
| SiH content | hydrogen, as silicon bonded hydrogen, as measured by $^{29}$Si NMR |
| THF | tetrahydrofuran |
| μL | microliter |
| μm | micrometer |
| Vi | vinyl |

It is to be understood that the appended claims are not limited to express and particular compounds, compositions, or methods described in the detailed description, which may vary between particular embodiments which fall within the scope of the appended claims.

What is claimed is:

1. A silicate resin that is a liquid at 25° C. in the absence of any solvent, said silicate resin having the average formula:

$[W]_a[X]_b[Y]_c[Z]_d$, where subscript a is from 0.20 to 0.35; subscript b is from 0.1 to less than 0.4;
subscript c is from greater than 0 to 0.30; and subscript d is from 0.45 to 0.55;
with the proviso that a+b+c+d=1; and
wherein:
 [W] is $[R_3SiO_{1/2}]$, where each R is an independently selected hydrocarbyl group;
 [X] is $[R_2SiO_{1/2}(OZ)]_{b'}[R_2SiO_{2/2}]_{b''}$, where each R is independently selected and as defined above; 0≤b'≤b; 0≤b"≤b; with the proviso that b'+b"=b; and each Z is independently H, an alkyl group, or a cation;
 [Y] is $[RSi(OZ)_{c'}O_{(3-c')/2}]$, where each R is independently selected and as defined above; each Z is independently selected and as defined above; c' is an integer from 0 to 2 and is independently selected in each siloxy unit indicated by subscript c in the silicate resin; and
 [Z] is $[Si(OZ)_{d'}O_{(4-d')/2}]$, where each Z is independently selected and as defined above, and subscript d' is an integer from 0 to 3 and is independently selected in each siloxy unit indicated by subscript d in the silicate resin;
with the proviso that an average of at least one R per molecule is an ethylenically unsaturated group;
wherein the silicate resin has a mole percent of SiOZ moieties of from greater than 15 to 80 percent based on the total number of moles of Si in each molecule, wherein each Z is independently selected and as defined above.

2. The silicone resin of claim 1, wherein subscripts b' and b" are each greater than 0, and wherein b'>b".

3. The silicate resin of claim 1, wherein subscript b is from 0.15 to less than 0.4.

4. The silicate resin of claim 1, wherein subscript a is from 0.28 to 0.32; subscript b is from 0.15 to 0.3; subscript c is from 0.01 to 0.10; and subscript d is from 0.45 to 0.52.

5. The silicate resin of claim 1, wherein each R is an alkyl group having from 1 to 6 carbon atoms, and wherein each $R^1$ is an alkenyl group having from 2 to 6 carbon atoms.

6. The silicate resin of claim 1, comprising a weight percent of silicon-bonded ethylenically unsaturated groups of from greater than 0 to 10 percent by weight of the silicate resin.

7. A method of preparing the silicate resin of claim 1, said method comprising:
   reacting an MQ resin and a silane component comprising a silane compound in the presence of a catalyst to give the silicate resin;
   wherein the silane compound has the formula $R^2R^3{}_x\text{SiOR}^3)_{3-x}$, where $R^2$ is as defined above, each $R^3$ is an independently selected alkyl group having from 1 to 4 carbon atoms, and subscript x is 0 or 1.

8. The method of claim 7, wherein the MQ resin has formula $M_zQ$, where $z<1$.

9. The method of claim 7, wherein, in the silicate resin, subscript a is from 0.20 to 0.35; subscript b is from 0.15 to 0.3; subscript c is from greater than 0 to 0.20; and subscript d is from 0.40 to 0.55, and wherein the silane component further comprises a third silane compound having the formula $R^3\text{Si}(OR^3)_3$ or $R^2\text{Si}(OR^3)_3$, where $R^2$ and each $R^3$ is independently selected and as defined above.

10. The method of claim 9, wherein in the silicate resin, subscript a is from 0.25 to 0.35; subscript b is from 0.15 to 0.25; subscript c is from 0.05 to 0.15; and subscript d is from 0.45 to 0.52.

11. The method of claim 7, wherein the catalyst comprises a base catalyst.

* * * * *